Patented July 24, 1951

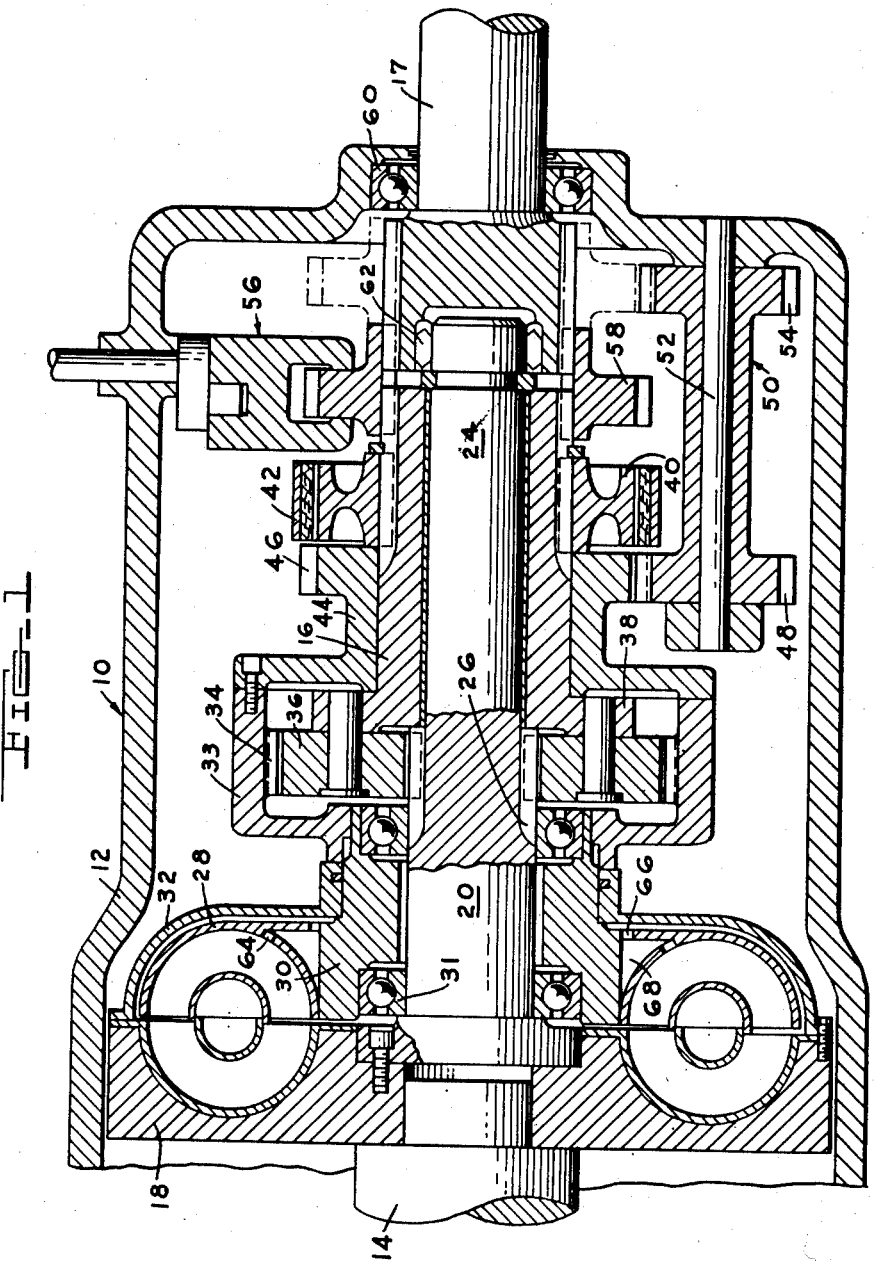

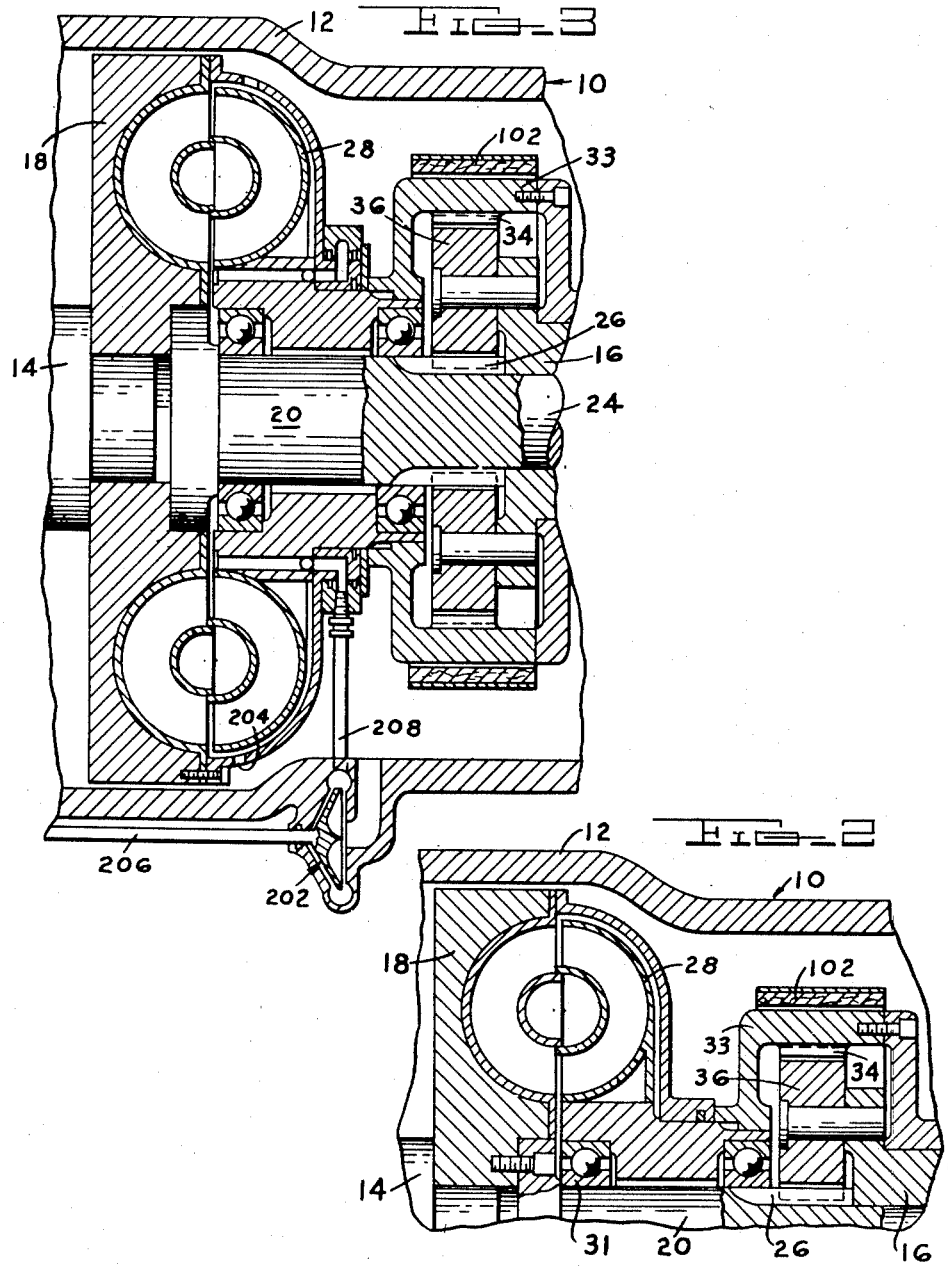

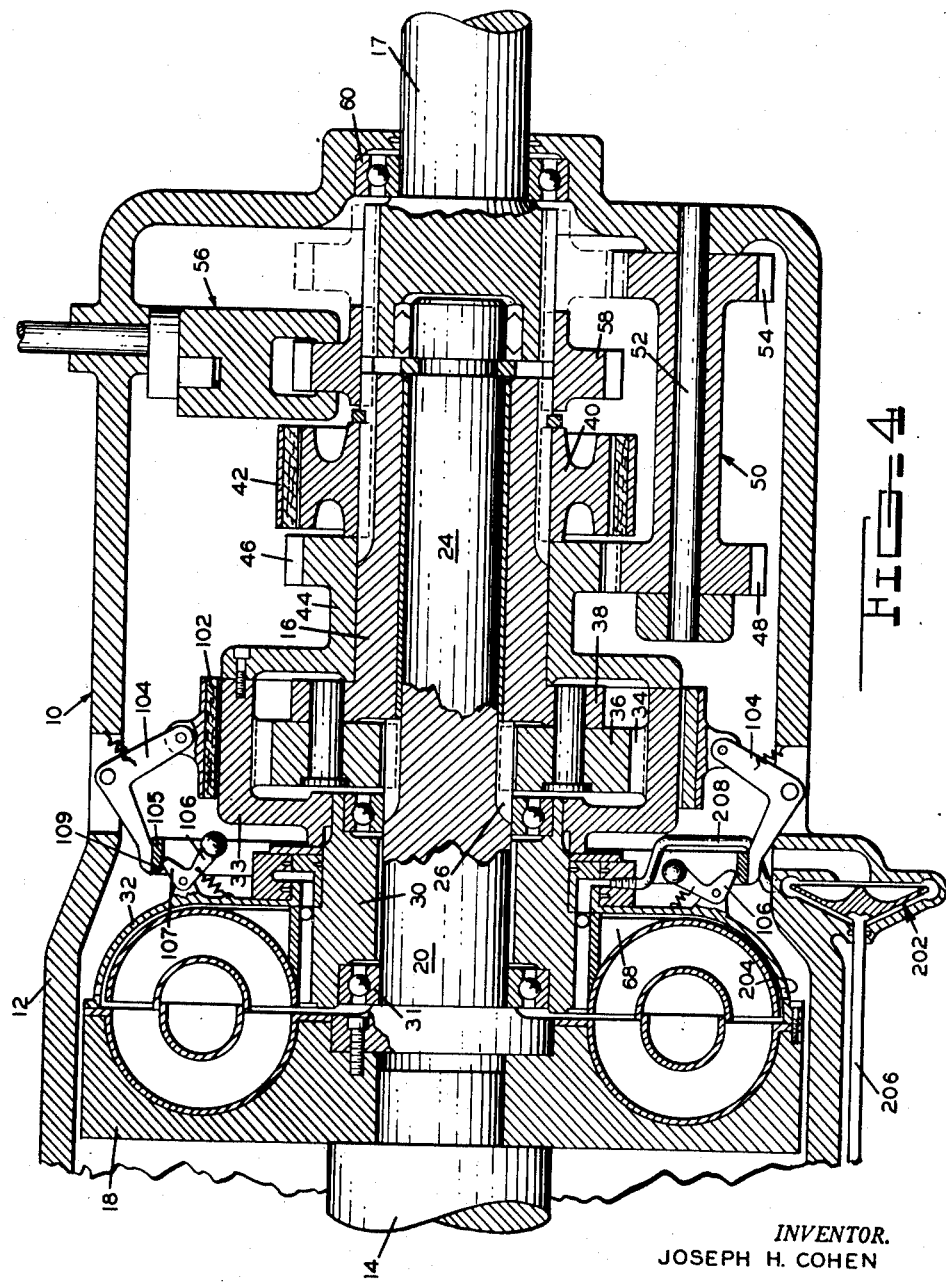

2,561,499

UNITED STATES PATENT OFFICE 2,561,499

AUTOMATIC TRANSMISSION

Joseph H. Cohen, Detroit, Mich.

Application February 28, 1947, Serial No. 731,503

6 Claims. (Cl. 74—688)

This invention relates to transmission and more particularly to automatic hydraulic transmission.

Broadly the invention comprehends the provision of an automatic transmission comprising a hydraulic coupling and planetary gear set interconnected in a manner effective to provide for all desired output speed and drive ratios smoothly and automatically.

An object of the invention is the provision of a hydraulic transmission for automotive vehicles that is simple and economical in construction.

Another object of the invention is the provision of a transmission incorporating a hydraulic coupling comprising cooperative impeller and runner members and having a planetary gear system operatively arranged intermediate thereof.

Another object of the invention is the provision of a hydraulic transmission for automotive vehicles comprising a simple arrangement of hydraulic coupling and planetary gear system effective to provide for an automatic infinitely variable transmission of power.

A further object of the invention is the provision of a hydraulic transmission for automotive vehicles comprising a hydraulic coupling and a planetary gear system interconnected therewith and automatically responsive controls for the coupling and planetary gear system providing for the effective automatic operation of the transmission infinitely between a multiple reduction drive ratio and substantially direct or 1 to 1 ratio.

A yet further object of the invention is the provision of an automatic infinitely operable automotive transmission comprising a hydraulic coupling and a planetary gear system associated therewith wherein the relative speed between the input and output speeds of the coupling determines the drive ratios of the output member of the transmission.

Other objects and advantages of the invention will appear from the following description taken in connection with the drawings, forming a part of the specification; and in which:

Fig. 1 is a vertical cross sectional view taken through an automatic hydraulic transmission;

Fig. 2 is a vertical cross sectional fragmentary view of a modification of the transmission shown by Fig. 1; and Fig. 3 is a vertical cross sectional fragmentary view of a further modification of the transmission shown by Fig. 1; and Fig. 4 is a vertical cross sectional view of the automatic hydraulic transmission of Fig. 1 including the added embodiments of Figs. 2 and 3.

Although numerous transmission have been devised for automatic operation incorporating combined hydraulic coupling and gearing arrangements, none has utilized the arrangement of simple hydraulic coupling and simple planetary gearing system wherein the planetary gear system is so interconnected with the hydraulic coupling that the output of the transmission is determined by the relative speeds of the gears of the planetary gear system as controlled by the relative speed existing between the input and output members of the hydraulic coupling. This arrangement permits of an automatic infinitely variable delivery of power from the output member of the transmission between a predetermined ratio as established by the gear ratio of the planetary gear system and the means of control thereof and substantially a direct drive or 1 to 1 ratio depending on the efficiency of the hydraulic coupling.

Referring to Fig. 1 of the drawings for more specific details of the invention, 10 represents generally an automatic transmission comprising a stationary housing 12, an engine output or drive shaft 14, an intermediate powered shaft 16 of the transmission, and the transmission output or drive shaft 17.

The engine output shaft 14 constitutes the input shaft of the transmission and has fixedly secured thereon a combination flywheel and fluid coupling impeller member 18. The member 18 has secured upon a central hub thereof a shaft 20 which is arranged concentric to shaft 14 and extends axially therefrom including a reduced portion 22 and a portion 24 providing a sun gear 26 the purpose of which will hereinafter appear.

Juxtaposed the impeller 18 and arranged for association therewith is a runner member 28 that is secured upon a short sleeve 30 mounted for rotation on bearings 31 supported upon shaft 20. The runner 28 is shrouded by a housing 32 secured to member 18 and having sealing engagement upon sleeve 30.

The sleeve 30 has splined at one end thereof a gear cage member 33 providing a ring gear 34 arranged internally thereof in radial alignment with the sun gear 26. The sun and ring gears have arranged in meshing engagement therebetween a plurality of planet pinions 36 forming in conjunction with said other gears a complete planetary gear system. The planet pinions are rotatably mounted upon a carrier member 38 constituting the intermediate sleeve shaft 16 concentrically rotatable about shaft 20. The shaft 16 has splined thereto a brake drum 40 adapted to be engaged by a brake band 42 during the reversing operation of the transmission.

The member 33 has affixed upon one end thereof a sleeve member 44 enclosing the planetary gear system and including a sun gear 46, said sun gear being engageable with a gear 48 of a gear cluster 50 rotatable upon jack shaft 52 journaled in the housing 10. The gear cluster includes in addition to gear 48 a gear 54 to form the reversing gear machines of the transmission.

The intermediate shaft 16 constitutes the forward drive output shaft of the transmission and the forward drive thereof is transmitted to the output shaft 17 of the transmission by a manual shift mechanism 56 adapted to shift a ring gear 58 having an internal spline from full line position coupling shafts 16 and 17 together or to dotted line position providing for the transmission of power from ring gear 46 to gear 48 thence from gear 54 to gear 58, effective to rotate shaft 17 independently of shaft 16. As shown by Fig. 1, the shaft 17 is journaled in the housing 12 upon bearing 60 and at its end adjacent shaft 16 is supported upon bearings 62 mounted upon the free extremity of shaft 20.

The runner member 28 has arranged in the wall thereof near its central hub a plurality of openings 64 and 66 respectively, the purpose of which will hereinafter appear.

In a normal operation with the transmission set for forward drive wherein the mechanism 56 is in full line position, upon the rotation of shaft 14 the impeller 18 and shaft 20 are driven initially effecting rotation of sun gear 26. During the idling speed of operation of the sun gear 26, the resistance to rotation of output shaft 17 and shaft 16 are determined by the weight of the vehicle with which the transmission is to be associated and other drive components of the vehicle to be driven from shaft 16 such as to resist rotation of the planet gears 36 about the transmission axis while at the same time the planet pinions are rotated about their own axis resulting in rotating the ring gear 34 and runner 28 reversely to gear 26. At this stage of operation the runner places only a slight load on the impeller member inasmuch as the liquid is normally confined during static condition and low speed of the runner in a central chamber 68 near the runner hub. Although a chamber 68 is here provided as a receptacle for the operating liquid for low speeds of rotation of the impeller and runner as cooperative elements so as to reduce drag placed on the impeller when it is desired to solely rotate the impeller independent of the runner, it is not essentially necessary depending upon the allowable drag that may be permissibly placed upon the impeller by the liquid in the coupling at idling and low speeds of operation thereof. As the speed of the shaft 14 is increased over that of idling speed, the speed of the impeller and sun gear are likewise increased thereby imparting a greater lineal speed to the planet pinions. With the increased speed of operation of the impeller a more noticeable drag occurs between the impeller and runner effective to resist the reverse rotation of the impeller resulting in providing for the imparting of motion through shaft 16 to output shaft 18 by way of the planet pinions rotating in an orbit as driven from the relative rotation of gears 26 and 34. During this phase of operation the output shaft will be rotating at a multiple speed reduction and increased torque multiplication depending upon the relative ratio provided by the planetary gear system and the predetermined degree of drag provided between the runner and impeller.

A further increase in speed of the shaft 14 and impeller 18 results in decreasing the slip between the impeller and runner for as the speed of said coupling member is increased the liquid is delivered from the chamber 68 to the operating zone of the runner thereby providing more operating liquid for the coupling.

As the slip is decreased between the impeller and runner the relative speed of rotation between the sun gear 26 and ring gear 34 decreases resulting in driving the shaft 16 at a reduced ratio from the starting ratio delivered to the output shaft 17. The ratio drive of the shaft 16 to the shaft 20 will continue to decrease infinitely as the slip between the impeller and runner decreases until such time when they shall be operating at top efficiency as a fluid coupling substantially at 1 to 1 thereby effecting a similar drive of shaft 16 to shaft 20 as controlled by the differential of speed between ring gear 34 and sun gear 26. It is to be observed that the transmitted power is automatic and infinite between the limit as governed by the gear ratio design and slip factor provided between the impeller and runner and a substantially 1 to 1 drive dependent on the slip occurring at the maximum operating speed of the fluid coupling. The drive likewise responds reversely upon the decrease in speed delivered by the shaft 14 as described above in reference to the increase in speed of shaft 14 and the elements associated therewith. This completes a forward cycle of operation of the transmission.

The reverse operation of the transmission is effected by the combined braking action of brake 42 and the shifting of gear 58 to dotted line position wherein a direct transmission of force is provided leading from shaft 14 through gear cage 33, gear 46, and gears 48 and 54 to gear 58 splined to output shaft 17.

Fig. 2 of the drawings illustrates a modification of the structure shown by Fig. 1 specifically with regards to the control of the transmission wherein a brake band 102 is arranged for engagement upon gear cage member 33, acting as a brake drum for ring gear 34.

With the addition of the braking control to the transmission it is possible to positively regulate the output of the transmission more completely. The brake 33—102 can be controlled for operation by either a speed governor associated with the drive shaft 14 or in response to the torque demand of the vehicle with which the transmission is associated.

The brake 33—102 shall be operable for the proper functioning of the transmission solely during a predetermined range of speed of the shaft 14 or torque demand placed upon shaft 16 such that the full effect of speed reduction and torque output can be derived from the planetary gear system. By braking the gear cage 33 and the ring gear 34 associated therewith the planet pinions 36 and output shaft 16 will be driven at a speed in keeping with the drive ratios of the planetary gear system of the sun gear 26 to the ring gear 34 thereby effecting a maximum torque output of the shaft 16.

The brake 33—102 is inactive during idling speeds of shaft 14 so that as predetermined in accordance with vehicle design, weight, wheel friction, gear friction, and the like the rotation of the sun gear imparts motion to the planet pinions 36 which in turn through this rotation thereof transmit said motion to ring gear 34 and runner 28 for the reverse rotation thereof. During the predetermined idling speeds of rotation of impeller 18 associated with shaft 14 the impeller through the medium of the hydraulic fluid carried by the associated impeller and runner members is not sufficient to retard the reverse rotation of runner 28. The brake 33—102 is also to be inactive when the speed of shaft 14 attains a predetermined figure or the torque demand placed on shaft 16 is as predetermined, wherein it is released and the impeller through the medium of the hydraulic fluid is effective to rotate the runner and ring gear attached thereto to thereby infinitely change the torque output or speed reduction of shaft 16 from the maximum amount during the locked relation of the ring gear to the planet pinions and sun gear to the condition of maximum efficiency between the impeller and runner wherein the output shaft 16 operates substantially in the ratio of 1 to 1 to the shaft 14.

Fig. 3 of the drawings is a further modification of both of structures shown by Figs. 1 and 2 and differs therefrom merely in the provision of a further control over that afforded by Fig. 2 in the form of a pump 202 for controlling the supply of hydraulic fluid to the fluid coupling when it is required, that is when it is desirous to positively drive the runner 28 from the impeller 18. The impeller 18 and runner 28 of Fig. 3 differ from the structure of Figs. 1 and 2 in that the housing 32 affixed to the impeller is provided with a plurality of openings 204, said openings allowing the hydraulic fluid of the coupling to drain therethrough during the idling speeds of the impeller and the omission of the openings 64 and 66 from the runner inasmuch as they have no function in view of the provision of a hydraulic fluid supply pump.

The pump 202 as here shown is of the conventional radial type and is driven by a shaft 205 from an output means of the engine and is connected at the intake thereof with the fluid sump of the transmission. The output of the pump is connected by suitable conduit 208 and appropriate fittings through a passage in the hub of runner 28 with a zone intermediate the impeller and runner such that when the fluid is required by the fluid coupling it will immediately be received in the working zone of the coupling.

The pump 202 is adapted to be operable just prior to the release of brake 33—102 in accordance with either predetermined speed of the shaft 14 or torque demand of shaft 16 such that the fluid may begin to fill up the vortex provided between the impeller and runner effective to provide for the transmission of power therebetween. With the release of the brake and the simultaneous delivery of fluid to the coupling the runner will be driven from the impeller with slippage thus controlling the output speed of shaft 16 as determined by the relative speed between ring gear 34 and sun gear 26. As the speed of the impeller increases and the fluid is delivered to the coupling to fill same the speed differential between the impeller and runner will decrease until substantially a 1 to 1 drive is attained therebetween thus effecting a substantially 1 to 1 output drive of the shaft 16 to shaft 14.

As disclosed by Figure 4 the brake band 102 is pivotally mounted by actuating levers 104 to the stationary housing, said lever having an annular ring 105 at its other end adapted to be actuated by speed responsive governors 106 mounted for rotation with and pivotally moveable upon housing 32, effective upon the attainment of a predetermined range of speed of housing 32 to control the braking of ring gear 34 after the attainment of the predetermined speed of the housing effective to actuate brake 33—102 and inhibit rotation of ring gear 34 and for a predetermined range of speed thereafter the braking application is maintained but beyond said range the ends 107 of governors 106 will move over the curved ends of the annular ring 105 resulting in a release of the brake for any speeds therebeyond. The annular ring is of the interlocking split variety permitting of the expansion and contraction thereof due to the ends 107 of the governors bearing internally thereon to expand same or the spring tension relationship of levers 104 acting to contract same depending upon the condition of operation taking place.

While this invention has been described in connection with certain specific embodiments, the principle involved is susceptible of numerous other applications that will readily occur to persons skilled in the art. The invention, therefore, is limited only as indicated by the scope of the appended claims.

What I claim is:

1. In an automatic transmission, an input shaft, a fluid coupling comprising cooperative impeller and runner members, said impeller being driven by the input shaft, an intermediate shaft, an output shaft, a planetary gear system comprising meshing sun, pinion and ring gears gearing the impeller and runner together, the sun gear being affixed to the impeller, the ring gear being affixed to the runner and the planetary pinions coupling the sun and ring gears together being affixed to the intermediate shaft, means integral with the ring gear, jack shaft gearing coupled to said means integral with the ring gear, shiftable means for directly coupling the intermediate and output shafts in one position and for coupling the output shaft to the jack shaft gearing in another position, means for retarding the rotation of the intermediate shaft to provide for reverse operation of the transmission when the shiftable means couples the jack shaft gearing to the output shaft and an automatically actuated brake for controlling rotation of the ring gear.

2. In an automatic transmission, an input shaft, a fluid coupling comprising cooperative impeller and runner members, said impeller being driven by the input shaft, an intermediate shaft, an output shaft, a planetary gear system comprising meshing sun, pinion and ring gears gearing the impeller and runner together, the sun gear thereof being affixed to the impeller, the ring gear thereof being affixed to the runner and the planetary pinions coupling the sun and ring gears together being affixed to the intermediate shaft, means integral with the ring gear, an automatically actuated brake for controlling rotation of the ring gear, jack shaft gearing coupled to said means integral with the ring gear, shiftable means for directly coupling the intermediate and output shafts in one position and for coupling the output shaft to the jack shaft gearing in another position, means for retarding the rotation of the intermediate shaft to provide for reverse operation of the transmission when the shiftable means couples the jack shaft gearing to the output shaft and a fluid supply pump for controlling the operation of the coupling.

3. In an automatic transmission, a fluid coupling comprising cooperative impeller and runner members, a planetary gear system comprising cooperative ring gear, sun gear, and planet pinions coupling the impeller and runner members together, an intermediate output shaft directly coupled to the planet pinions, an output shaft, means coupling the intermediate and output shafts together for direct drive therethrough, gear including means for coupling the ring gear to the output shaft by way of the first means, means for retarding rotation of the intermediate shaft for the reverse operation of the output shaft, and brake means operably engageable with the ring gear for controlling the operation of the runner and ring gear.

4. In an automatic transmission, a power input shaft, a fluid coupling comprising cooperative impeller and runner members, said impeller being driven by the input shaft, an intermediate power shaft, a power output shaft, a planetary gear system comprising meshing sun, pinion and ring gears gearing the impeller and runner together, the sun gear thereof being affixed to the impeller, the ring gear thereof being affixed to the runner and the planetary pinion gears thereof being affixed to the output shaft, means integral with the ring gear, brake means operably actuated into engagement with the ring gear for controlling the rotation thereof, fluid drain means arranged at substantially the outer periphery of the coupling, jack shaft gearing coupled to said means integral with the ring gear, shiftable means for directly coupling the intermediate and output shafts in one position and for coupling the output shaft to the jack shaft gearing in another position, means for retarding the rotation of the intermediate shaft to provide for reverse operation of the transmission when the shiftable means couples the jack shaft gearing to the output shaft and controlled fluid pumping means for supplying fluid to the coupling at substantially the inner periphery of the coupling between the impeller and runner.

5. In an automatic transmission, a power input shaft, a fluid coupling comprising cooperative impeller and runner members, said impeller being driven by the input shaft, an intermediate power shaft, a power output shaft, a planetary gear system comprising meshing sun, pinion and ring gears gearing the impeller and runner together, the sun gear thereof being affixed to the impeller, the ring gear thereof being affixed to the runner and the planetary pinion gears thereof being affixed to the intermediate shaft, means integral with the ring gear, automatically actuated brake means for controlling the rotation of the ring gear, means providing for drainage of the fluid from the coupling, jack shaft gearing coupled to said means integral with the ring gear, shiftable means for directly coupling the intermediate and output shafts in one position and for coupling the output shaft to the jack shaft gearing in another position, means for retarding the rotation of the intermediate shaft to provide for reverse operation of the transmission when the shiftable means couples the jack shaft gearing to the output shaft and pumping means operable for supplying fluid to the coupling shortly prior to the release of the brake from controlling the rotation of the ring gear.

6. In an automatic transmission, a power input shaft, a fluid coupling comprising cooperative impeller and runner members, said impeller being driven by the input shaft, an intermediate power shaft, a power output shaft, a planetary gear system comprising meshing sun, pinion and ring gears gearing the impeller and runner together, the sun gear thereof being affixed to the impeller, the ring gear thereof being affixed to the runner and the planetary pinion gears thereof being affixed to the intermediate shaft, means integral with the ring gear automatically actuated brake means engageable with the means integral with the ring gear for controlling the rotation of the ring gear, means providing for drainage of the fluid from the coupling, pumping means operable for supplying fluid to the coupling shortly prior to the release of the brake from controlling the rotation of the ring gear, jack shaft gearing coupled to the means integral with the ring gear, shiftable means for coupling the intermediate and output shafts together in one position of operation and for coupling the jack shaft gearing to the output shaft in another position of operation and means for retarding rotation of the planet pinion gears providing for the reverse operation of the transmission through the gearing coupled to the means integral with the ring gear.

JOSEPH H. COHEN.

REFERENCES CITED

The following references are of record in the file of this patent:

UNITED STATES PATENTS

| Number | Name | Date |
|---|---|---|
| 1,203,265 | Radcliffe | Oct. 31, 1916 |
| 1,900,118 | Lysholm | Mar. 7, 1933 |
| 1,949,816 | Smith-Clarke | Mar. 6, 1934 |
| 2,069,360 | Duffield | Feb. 2, 1937 |
| 2,196,660 | Dodge | Apr. 9, 1940 |
| 2,203,546 | Pollard | June 4, 1940 |
| 2,204,779 | Swennes | June 18, 1940 |
| 2,290,319 | Dodge | July 21, 1942 |
| 2,301,294 | Kuhns et al. | Nov. 10, 1942 |
| 2,366,063 | Seybold | Dec. 26, 1944 |
| 2,430,258 | Thompson | Nov. 4, 1947 |